United States Patent [19]

Aihara et al.

[11] 4,359,273

[45] Nov. 16, 1982

[54] PHOTOGRAPHING APPARATUS

[75] Inventors: Mamoru Aihara; Yutaka Takahashi; Yoshio Nakajima, all of Hachioji; Tsuyoshi Matsuura, Ina, all of Japan

[73] Assignee: Olympus Optical Company Ltd., Tokyo, Japan

[21] Appl. No.: 192,253

[22] Filed: Sep. 30, 1980

[30] Foreign Application Priority Data

Oct. 5, 1979 [JP] Japan ................ 54/128008

[51] Int. Cl.$^3$ ............................... G03B 7/08
[52] U.S. Cl. ..................... 354/23 D; 354/50; 354/51
[58] Field of Search ............. 354/23 D, 50, 51

[56] References Cited

U.S. PATENT DOCUMENTS 4,103,307  7/1978  Shinoda et al. ............... 354/23 D

FOREIGN PATENT DOCUMENTS 52-33234  7/1977  Japan .
52-86332  7/1977  Japan .

Primary Examiner—Russell E. Adams
Attorney, Agent, or Firm—Weinstein & Sutton

[57] ABSTRACT

A photographing apparatus includes a central processing unit to which input information is supplied inclusive of film speed, correction factors to correct for the failure of the reciprocity law and other photographing conditions which are based on such input information, controls a selective connection of integrating capacitors in an integrating circuit and calculates an expected exposure period and the remainder of the exposure period in which the failure of the reciprocity law is corrected for.

13 Claims, 11 Drawing Figures

PHOTOGRAPHING APPARATUS

BACKGROUND OF THE INVENTION

The invention relates to a photographing apparatus, in particular, to a photographing apparatus for use with a microscope which enables a proper correction for the failure of the reciprocity law.

In a photographing apparatus, factors relating to the response of a film used includes film speed (indicated in terms of ASA value or DIN number), film size and the failure of the reciprocity law. A conventional photographing apparatus is capable of accommodating for variations of a film speed and film size. However, the failure of the reciprocity law is little corrected or, if corrected, is not properly corrected.

The failure of the reciprocity law occurs when there is very weak light or very strong light where the relative sensitivity of the film is reduced as a departure from Bunsen-Roscoe's reciprocity law. It typically occurs in a flash photography in which an exposure is achieved for a brief time with a strong spark light source, in a photographing of a star or stars over a prolonged exposure period through an astronomical telescope or in a photographing of a sample under reduced illumination over a prolonged period of time through a microscope. In particular, when photographing an object under a very bright illumination or under a very dark illumination to require an exposure period less than 1/1000 second or greater than one-half second, the reaction of the film is not proportional to the product of the illuminance and the exposure period or the amount of the exposure, preventing a photograph of a proper density from being obtained. The behaviour of the failure of the reciprocity law depends on the kind of films. Representing an exposure period in which the failure of the reciprocity law is corrected for by $T'_e$ and an exposure period in a region where the reciprocity law applies (namely, where the photochemical reaction of the film is proportional to the amount of exposure, such region being hereafter referred to as a linear region) by $T_e$, the following equality applies:

$$T_e = \alpha T_e'^{\beta} \qquad (1)$$

In this equation, both $\alpha$ and $\beta$ are constants which depend on the kind of the film.

Several apparatus have heretofore been proposed which provides a correction for the failure of the reciprocity law. By way of example, Japanese Published Unexamined Utility Model Application No. 33,234/1977 discloses an electrical shutter in which a shutter controlling, electromagnetic mechanism is operated by a CR time constant circuit, formed by a first photoconductor and a capacitor, and which is connected in series with a transistor. The series combination of the time constant circuit and the transistor is shunted by a compensation circuit including a second photoconductor and a resistor. When the second photoconductor exhibits a high resistance, namely, when an object being photographed is under low illumination, the transistor exhibits an increased internal resistance through which a discharge occurs, thereby increasing an exposure period. However, the degree of correction achieved in the electrical shutter is uniquely determined by the illuminance of the object, the internal resistance of the second photoconductor, the capacitance of the capacitor, the supply voltage and the trigger voltage, and hence suffers from a disadvantage that a correction cannot be made in a manner corresponding to the kind of the film used. Japanese Published Unexamined Patent Application No. 86,332/1977 discloses a digital electrical shutter including a counter circuit for storing pulses from an object being photographed and in which an oscillation frequency is automatically decreased in response to a low illuminance to provide a correction for the failure of the reciprocity law. However, in this arrangement, the shutter is of a memory type in which an exposure period is determined by the amount of light prevailing immediately before a photographing operation takes place. Hence, a correction cannot be made for the failure of the reciprocity law in a manner which faithfully follows a change in the illuminance of the object occurring during the exposure process. In addition, the degree of correction is uniquely determined by circuit parameters, and cannot be made in accordance with the kind of the film.

Thus, conventional electrical shutters which are designed to provide a correction for the failure of the reciprocity law are incapable of providing a satisfactory correction in accordance with the film used, and thus cannot satisfy the requirement defined by the equation (1).

SUMMARY OF THE INVENTION

It is an object of the invention to eliminate the above disadvantages by providing a photographing apparatus employing an electrical shutter of the real time photometry (direct photometry) type so that a correction is made for the failure of the reciprocity law in accordance with the kind of a film used and the brightness of an object being photographed, thereby enabling a photographing operation, in particular, a photographing operation through a microscope, to be achieved with a proper exposure period.

According to the invention, an expected exposure period in which the failure of the reciprocity law is corrected for is sequentially calculated during the course of a photographing operation. An actual exposure period is subtracted from the expected exposure period to derive the remainder of the exposure period in a sequential manner. When the remainder of the exposure period becomes substantially zero, a shutter of the photographing apparatus is closed. In this manner, an exposure is assured which has fully taken a fluctuation in the brightness of an object being photographed into consideration. In addition, the remainder of the exposure period can be displayed.

DESCRIPTION OF PREFERRED EMBODIMENT

Figure 1:
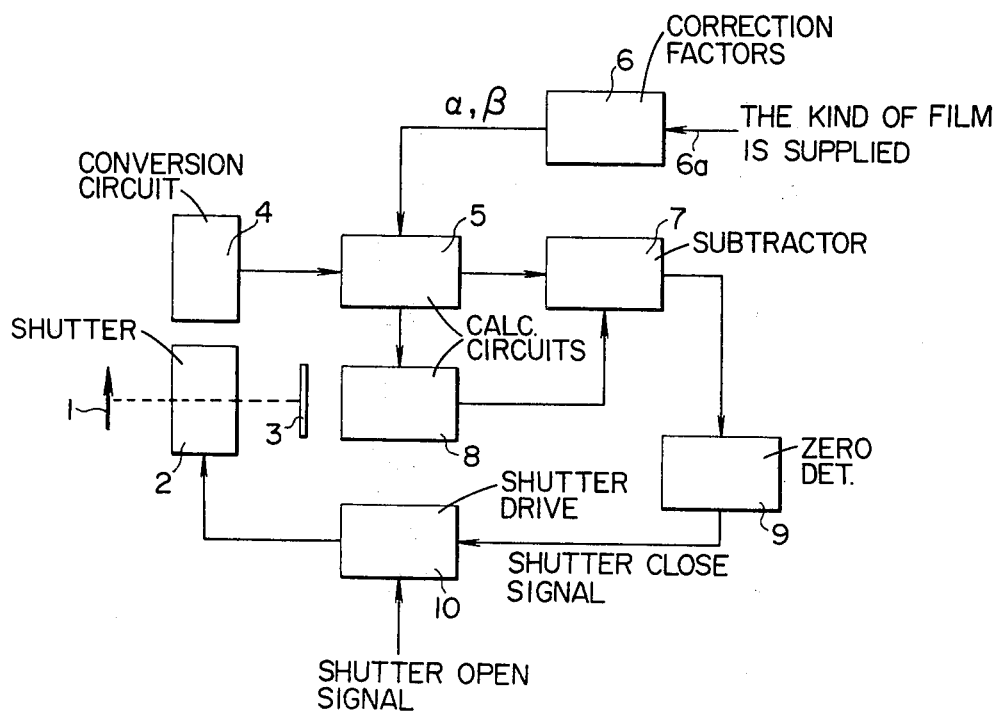
FIG. 1 is a block diagram of a basic arrangement of a photographing apparatus according to the invention.

Referring to FIG. 1, there is shown a basic arrangement of a photographing apparatus according to the invention in a block diagram. The image of an object 1 to be photographed is projected through an optical system (not shown) such as an objective lens and a shutter 2 onto a film 3. To provide a correction for the failure of the reciprocity law in order to obtain a photograph of a proper exposure, namely, a photograph which exhibits a desired density after development, it is necessary that the exposure period be controlled in accordance with the brightness of the object 1. To this end, the photographing apparatus shown in FIG. 1 includes a circuit 6 in which constants are preset to provide a correction for the failure of the reciprocity law. The circuit 6 supplies signals corresponding to the correction factors $\alpha$, $\beta$ appearing in the equation (1) and which depends on the film used.

The brightness of the object 1 is determined by a photoelectric conversion circuit 4 including a photoelectric transducer element such as silicon photodiode, which provides an electrical signal proportional to the brightness for supply to a calculation circuit 5. The output signal from the conversion circuit 4 is generally in the form of an integrated voltage formed by an integrating circuit, not shown, which integrates a photocurrent from the transducer element, and corresponds to the product of the illuminance and time or the amount of exposure supplied. Based on the amount of exposure, the calculation circuit 5 calculates an exposure period which is required to achieve a desired exposure in the linear region. Circuit 6 which presets constants or correction factors to correct for the failure of the reciprocity law is supplied with input information indicative of the kind of film used, as indicated by an arrow 6a, and supplies correction factors $\alpha$, $\beta$ corresponding to the input information to the calculation circuit 5. In response to these correction factors $\alpha$, $\beta$ and the calculated exposure period in the linear region, the calculation circuit 5 calculates an expected exposure period according to the equation (1) in which the failure of the reciprocity law is corrected for.

With the photographing apparatus of the invention, during the course of a photographing operation, an expected exposure period which will be required to achieve a desired exposure is determined by the calculation circuit 5 on the basis of the amount of exposure. Then, an equivalent exposure period is determined which represents the elapsed exposure period at the time the expected exposure period is determined, and is subtracted from the expected exposure period to derive the remainder of the exposure period. The time when the remainder of the exposure period reaches zero is detected, and an exposure termination signal is then produced to close the shutter, thus terminating the exposure. Specifically, the expected exposure period which is calculated by the calculation circuit 5 is supplied to a subtractor 7, and the calculation circuit 5 also supplies the value (or "a datum") of the amount of exposure from the initiation of an exposure until the time when the expected exposure period is determined (E(tm) in FIG. 2 denotes the above-mentioned "value") to another calculation circuit 8 which calculates the equivalent exposure period, which is then supplied to the subtractor 7. The subtractor 7 then subtracts the equivalent exposure period from the expected exposure period to derive the remainder of the exposure period, which is fed to a zero detector 9. The zero detector 9 monitors the remainder of the exposure period supplied from the subtractor 7 to detect the time when it reaches zero. When zero is detected, the zero detector 9 produces a shutter close signal, which is supplied to a shutter drive circuit 10. It will be understood that a shutter open signal has been supplied to the shutter drive circuit 10 in response to the depression of a shutter release button, and hence the shutter 2 is maintained open. When the shutter close signal is supplied to the shutter drive circuit 10 from the zero detector 9 in the manner mentioned above, the shutter drive circuit 10 closes the shutter 2, thus terminating a photographing operation.

Figure 2:
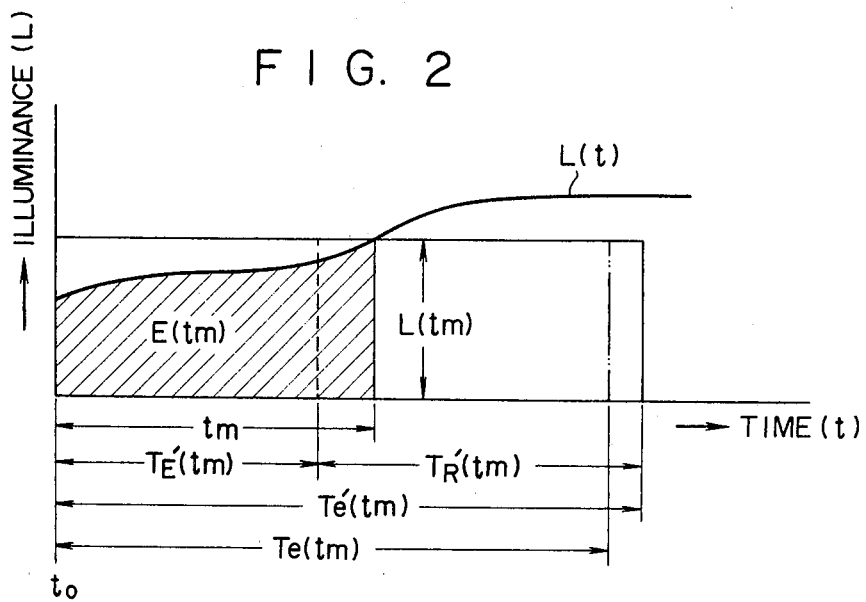
FIG. 2 graphically shows an expected exposure period, an equivalent exposure period and the remainder of an exposure period as functions of illluminance and time.

Referring to FIG. 2, the relationship between the expected exposure period, the equivalent exposure period and the remainder of the exposure period as well as equations applicable to their derivation will be described. It is assumed that the exposure is initiated at time $T_O$, and it is desired to calculate an expected exposure period $T'_e(t_m)$ in which the failure of the reciprocity law is corrected at time $t_m$.

Generally, the exposure period T is related to the illuminance L under given photographing conditions as follows:

$$T = K/L \qquad (2)$$

where K represents a constant.

Representing the illuminance at time $t_m$ by $L(t_m)$, an expected exposure period $T_e(t_m)$ in case of the linear region under general photographing conditions will be given by the following equation:

$$T_e(t_m) = \frac{K}{L(t_m)} \qquad (3)$$

The illuminance $L(t_m)$ in the linear region remains constant over time, as shown in FIG. 2, and hence the exposure period $T_e(t_m)$ is inversely proportional to the illuminance $L(t_m)$. In this instance, the equation (3) indicates that the expected exposure period will be as shown in FIG. 2.

A modified expected exposure period $T'_e(t_m)$ corresponding to the expected exposure period $T_e(t_m)$ in the linear region but in which the failure of the reciprocity law is corrected for can be derived from the equation (1) as follows:

$$T'_e(t_m) = \alpha T_e(t_m)^\beta \qquad (4)$$

This expected exposure period $T'_e(t_m)$ corresponds to the illuminance $L(t_m)$ which remains constant. However, in actuality, the illuminance often varies with time, and an example $L(t)$ is illustrated in FIG. 2. Consequently, in accordance with the invention, a photographing operation with a proper exposure is accomplished by providing a correction for the failure of the reciprocity law and by taking a change in the illuminance $L(t)$ into consideration. Specifically, in addition to providing a correction for the failure of the reciprocity law, an equivalent exposure period at time $t_m$ is determined from the amount of exposure which has been determined by photometry where the illuminance L(t) varies. The equivalent exposure period is subtracted from the expected exposure period $T'_e(t_m)$ defined by the equation (4) to derive the remainder of the expected exposure period. The shutter is closed when the remainder reaches zero.

To consider this in more detail, the equivalent exposure period at time $t_m$ when operating in the linear region is equal to the elapsed time $t_m$. Representing the amount of exposure at time $t_m$ where the illuminance L(t) varies as indicated by a hatched area in FIG. 2 by $E(t_m)$, the quantity $E(t_m)$ divided by the illuminance $L(t_m)$ prevailing at time $t_m$ gives a quotient $T'_E(t_m)$, which represents an equivalent exposure period for a varying illuminance. In the example shown in FIG. 2, the equivalent exposure period $T'_E(t_m)$ is less than the actual elapsed time $t_m$. The equivalent exposure period is expressed as follows:

$$T_E(t_m) = \frac{E(t_m)}{L(t_m)} \qquad (5)$$

The remainder of the exposure period $T'_R(t_m)$ can be obtained by subtracting the equivalent exposure period $T'_E(t_m)$ of the equation (5) from the expected exposure period $T'_e(t_m)$. In other words, $$T_R(t_m) = T_e(t_m) - T_E(t_m) \qquad (6)$$
$$= T_e(t_m) - \frac{E(t_m)}{L(t_m)}$$

In accordance with the invention, the expected exposure period is sequentially derived during the course of the exposure. Representing the illumination at each instant by $L(t_1), L(t_2) \ldots L(t_m)$ which are spaced apart by time intervals of $\Delta t_1, \Delta t_2 \ldots \Delta t_m$, the equation (6) can be rewritten as follows:

$$T_R(t_m) = T_e(t_m) - \frac{\sum_{i=1}^{m} L(t_i) \times \Delta t_i}{L(t_m)} \qquad (7)$$

Thus, by obtaining the value of the illuminance at respective instants and the time interval therebetween, the remainder of the exposure period $T'_R(t_m)$ can be calculated according to the equation (7). The calculation takes place by the circuits 5, 8 and 7 in response to an illuminance signal from the conversion circuit 4 and correction factors α, β supplied from the circuit 6. A signal indicative of the remainder of the exposure period $T'_R(t_m)$ as defined by the equation (7) is fed to the zero detector 9, which closes the shutter 2 to terminate a photographing operation in the manner mentioned above.

Thus, it will be seen that the invention enables a photographing operation for a varying illuminance and with an effective correction for the failure of the reciprocity law depending on the film used. Since the photographing apparatus of the invention normally calculates the expected exposure period and the remainder thereof, the latter can be easily displayed or printed out. Also an actual exposure period from the opening until the closing of the shutter can be displayed or printed out.

Figure 3:
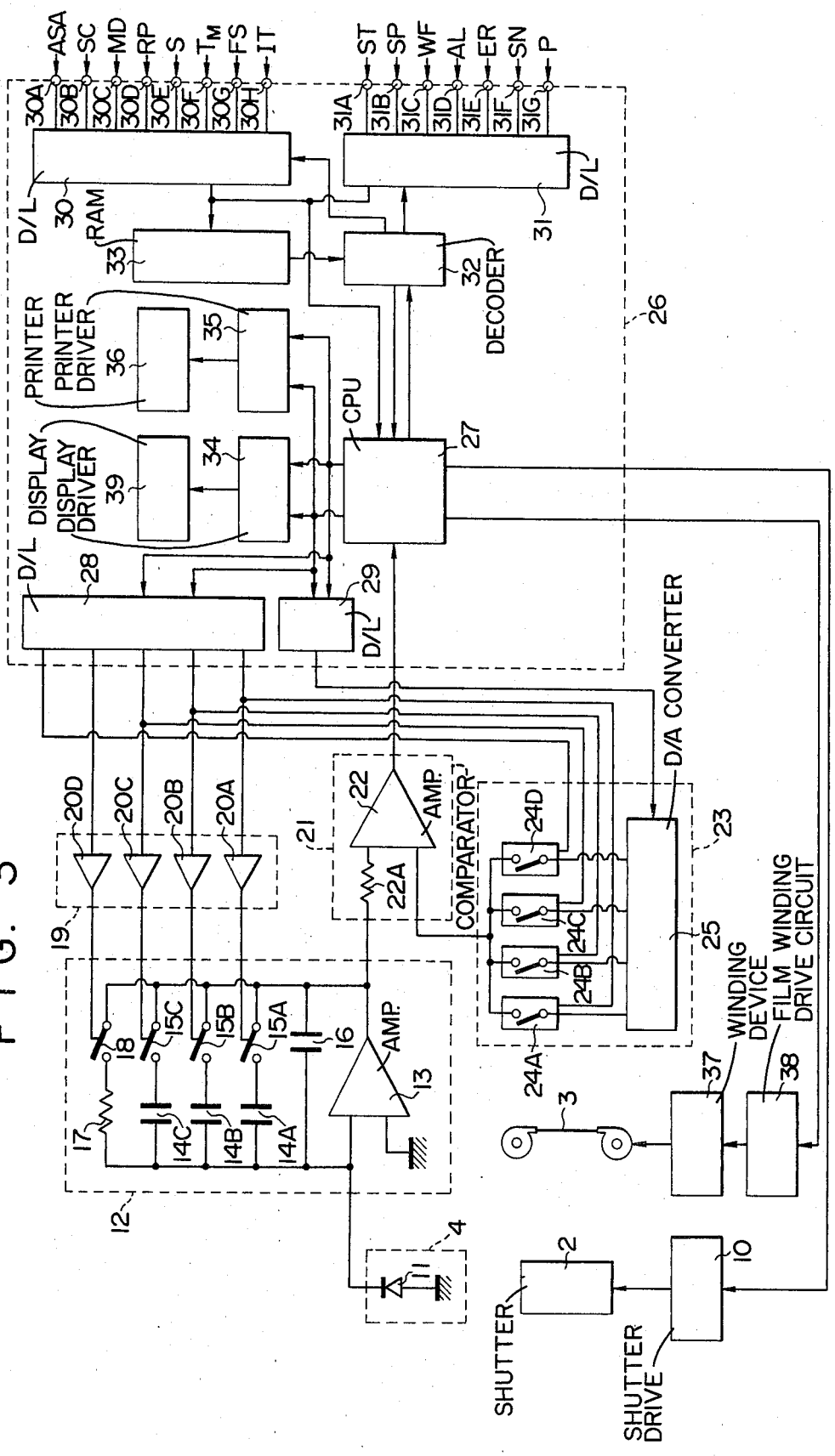
FIG. 3 is a schematic diagram of a photographing apparatus according to one embodiment of the invention.

FIG. 3 is a block diagram of the entire arrangement of a photographing apparatus according to one embodiment of the invention. Referring to FIG. 3, the photoelectric conversion circuit 4 is indicated by a phantom line block. It includes a silicon photodiode 11 as a transducer element, which has its anode connected to the ground. The cathode of the photodiode 11 is connected to one input of an operational amplifier 13 which represents one component of an integrating circuit 12. The other input of the operational amplifier 13 is connected to the ground. The integrating circuit also includes a main or fixed integrating capacitor 16 connected across the one input and the output of the operational amplifier 13, and which is shunted by a plurality of series circuits each including a switch 15A and an integrating capacitor 14A, a switch 15B and an integrating capacitor 14B, and a switch 15C and an integrating capacitor 14C. The main capacitor 16 is also shunted by a series combination of a resistor 17 and a switch 18. It will be understood that, by selectively operating the switches 15A to 15C, any one of additional integrating capacitors 14A to 14C may be connected in circuit with the main capacitor 16. The output of the operational amplifier 13 is connected through a resistor 22A to one input of an operational amplifier 22, the other input of which is supplied with a reference voltage, whereby the operational amplifier 22 operates as a voltage comparator 21 together with resistor 22A, comparing the output voltage from the operational amplifier 13 against the reference voltage. The output of the operational amplifier 22 is connected to a central processing unit (CPU) 27 which represents one component of a calculation control circuit 26.

The calculation control circuit 26 also comprises decoder/latches 28, 29, 30, 31, a random access memory (RAM) 33, an address decoder 32, a display driver 34, a display 39, a printer driver 35 and a printer 36. CPU 27 includes a memory which stores a program and a temporary memory which stores data, and can be easily implemented in the form of a usual microcomputer. Under the program control, CPU 27 supplies an address and data through the address decoder 32 to the decoder/latches 30, 31, whereby various information externally supplied to the decoder/latches 30, 31 may be entered into the CPU 27 either through RAM 33 and the address decoder 32 or directly. The information supplied is processed together with information which is supplied from the operational amplifier 22. Also, by feeding a control command to the decoder/latches 28, 29, the CPU 27 is capable of controlling the switches 15A to 15C and 18 as well as a reference voltage generator 23, which will be described later. Additionally, the CPU 27 supplies a control command and various data which is obtained as a result of the calculation performed therein to the display driver 34 and the printer driver 35, thus allowing such data or information to be displayed or printed by the display 39 and the printer 36.

It is to be understood that in the integrating circuit 12, the switches 15A to 15C and 18 are implemented as relay switches (coils being not shown) or CMOS analog switches, which are operated in response to a control command which is fed from the CPU 27 through the decoder/latch 28 and which selectively activates one or more of switch drivers 20A to 20D contained in a switch drive circuit 19. When these integrating capacitors 14A to 14C are selectively connected in circuit with the integrating circuit 12, the integrating interval is changed to permit the expected exposure period to be determined within a reduced time, in a manner to be described in more detail later. When the switchs 18 is closed, the integrated voltage across the integrating capacitors 14A to 14C, 16 can be discharged through the resistor 17.

The other input of the operational amplifier 22 is connected to receive a reference voltage from the reference voltage generator 23 so that the output voltage from the operational amplifier 13 of the integrating circuit 12 can be compared against the reference voltage. The reference voltage generator 23 includes a digital-analog converter 25 which receives digital information concerning a reference voltage from the CPU 27 through the decoder/latch 29 and converts such information into a corresponding analog signal. The analog signal is fed to the other input of the operational amplifier 22 through switches 24A to 24D, which are again in the form of relay switches (coils being not shown) or CMOS analog switches. Again, these switches are operated in response to a control signal which is fed from the CPU 27 through the decoder/latch 28. It is to be noted that the switches 24A to 24C are operated in a manner corresponding to the closure of the switches 15A to 15C in the integrating circuit 12 so that a reference voltage which corresponds to a particular one or ones of the integrating capacitors 14A to 14C which are connected in circuit with the operational amplifier 13 is supplied to the operational amplifier 22 from the reference voltage generator 23. The switch 24D is closed to supply a reference voltage to the operational amplifier 22 when the main integrating capacitor 16 alone is connected in the integrating circuit 12.

The CPU 27 also supplies a control command to the shutter drive circuit 10 in order to control the opening and closing of the shutter 2. Also, it supplies a control command to a film winding drive circuit 38 in order to control a winding operation of the film 3 by an automatic winding device 37.

The decoder/latches 30, 31 include a plurality of input terminals 30A to 30H and 31A to 31G, respectively, for supplying various input information to the CPU 27 in order to permit a variety of photographing conditions to be established. Such input information will be specifically described below.

Film speed information ASA .... This information is supplied through the input terminal 30A and represents an ASA film speed of the film 3 being used. Film speed in a range from ASA 6 to 6400 can be supplied.

Figure 4:
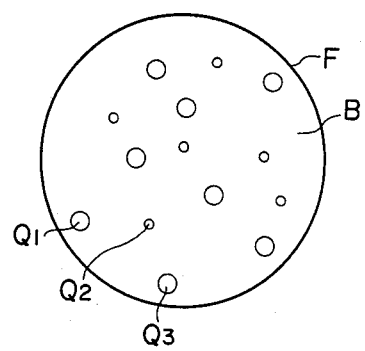
FIG. 4 is a diagram illustrating a sample density distribution which represents one of the photographing conditions.

Sample density distribution correction factor information SC .... This information is supplied through the input terminal 30B, and represents a correction factor which is used to enable a proper exposure of an object being photographed which is under an increased or reduced illumination as compared with the background of the field when the entire field is subject to photometry. By way of example, FIG. 4 illustrates a field F including a background B of an illuminance $L_1$ and having an area $W_1$. n objects $Q_i(i=1, 2 \ldots n)$ have respective illuminances $L_{2i}$ and areas $W_{2i}$. Then, the total area W and the total illuminance $L_T$ can be determined as follows:

$$W = W_1 + \sum_{i=1}^{n} W_{2i} \quad (8)$$

$$L_T = L_1W_1 + \sum_{i=1}^{n} L_{2i} \cdot W_{2i} \quad (9)$$

Consequently, the illuminance L per unit area is given as follows:

$$L = \frac{L_T}{W} = \frac{L_1W_1 + \sum_{i=1}^{n} L_{2i} \cdot W_{2i}}{W} \quad (10)$$

Assuming that the value of $L_{2i}$ is uniform everywhere and has a value $L_2$ and the total area of objects being photographed is equal to $W_2$, the equation (10) can be rewritten as follows:

$$L = \frac{L_1W_1 + L_2W_2}{W} \quad (11)$$

The correction factor SC which is employed to take a picture of $L_2$ with a proper exposure is given as follows:

$$SC = \frac{L_2}{L} = \frac{WL_2}{L_1W_1 + L_2W_2} \quad (12)$$

Photographing mode information MD .... This information is supplied through the input terminal 30C, and indicates whether an automatic or a manual mode is employed.

Correction constant for the failure of reciprocity law RP .... This information is supplied through the input terminal 30D, and corresponds to the correction factors $\alpha, \beta$ mentioned above. While these correction factors $\alpha, \beta$ may be directly supplied to the apparatus, in the present embodiment, to avoid a practical difficulty, the values of the correction factors are stored in the internal memory of the CPU 27 in a manner corresponding to the individual films, and by supplying information which indicates the kind of the film being used, the CPU 27 is enabled to retrieve the correction factors $\alpha, \beta$ which corresponds to the film used.

Film size compensation factor S .... This information is supplied through the input terminal 30E. For example, choosing 35 mm film as the basis or unity, the compensation factor for the Brownie film which measures 6 cm×9 cm is equal to 6.3 while the compensation factor for 16 mm film is equal to 0.3. In this manner, a compensation factor is supplied for a varying size of the film being used. However, since it is practically troublesome to supply a compensation factor information S depending on the size of the film used, the kind of the film used is specified to permit a corresponding compensation factor to be drived.

Manual mode exposures period information $T_M$ ... This information is supplied through the input terminal 30F, and is utilized to establish an exposure period when a manual photographing mode is selected.

Flash photography information FS .... This information is supplied through the input terminal 30G to establish an exposure period of 100 microseconds, for example, automatically for the flash photography. However, if required, a desired exposure period may be supplied through the input terminal 30F which is used to supply the manual mode exposure period information $T_M$.

Intervalometer control information IT .... This information is supplied through the input terminal 30H, and is utilized to preset an intervalometer so as to instruct the number of pictures frames which are taken at a given time interval whenever a long 35 mm film or a cine camera is employed.

The above information is supplied to the decoder/latch 30, and principally relate to photographing conditions. Information which is supplied to the decoder/latch 31 will now be described, and principally relate to instructions to control the operation of the calculation control circuit 26.

Initiation command information ST .... This information is supplied through the input terminal 31A, and triggers the operation of the photographing apparatus.

Stop command information SP .... This information is supplied through the input terminal 31B, and functions to stop the operation of the photographing apparatus. The stop command may be issued after the initiation command has been supplied and in the course of a photographing operation if it is desired to operate the operation of the photographing apparatus urgently, as a result of the recognition that a wrong information signal has been supplied to one or more of the terminals 30A–30H. Alternatively, the stop command may be supplied at a given time interval after the supply of the initiation command so that a picture can be taken within a predetermined exposure period when a manual photographing mode is selected.

Winding command information WF .... This information is supplied through the input terminal 31C, and is supplied to the CPU 27 to control the winding drive circuit 38 so that the automatic winding device 37 associated with the film 3 is energized to wind up the film 3. An automatic film winding takes place after each frame of the picture has been taken, and is also utilized during an initial film loading into the camera in order to wind up a leader portion of the film corresponding to several frames.

Automatic exposure fixing command information AL .... This information is supplied through the input terminal 31D, and when it is supplied to the apparatus, the initial frame is taken in an automatic exposure, and the second and subsequent frames are taken under the same exposure conditions as the initial frame. The automatic exposure fixing command AL is used in forming a montage photograph, and can be used, for example, in taking a picture with a microscope when it is desired to take a picture of a greater extent than the field through the movement of the stage of the microscope while maintaining the magnification of the objective fixed. If such a photographing operation takes place in an automatic exposure mode, each picture will be taken with the proper exposure, but it is the purpose of a montage photograph to take pictures on the basis of the brightness of a particular field which is chosen as the reference in order to know a variation of the brightness in the sample. To this end, the automatic exposure fixing command AL is effectively used.

Actual exposure period read command information ER .... This information is supplied through the input terminal 31E, and is used to read the actual exposure period to be indicated on the display 39. Specifically, the calculation control circuit 26 determines the actual exposure period from the opening until the closing of the shutter 2, and this actual exposure time can be displayed on the display 39 whenever this information is supplied.

Sample number information SN .... This information is supplied through the input terminal 31F, and indicates the number of the sample which is being photographed.

Print command information P .... This information is supplied through the input terminal 31G, and when it is supplied, the CPU 27 issues a print instruction to the printer driver 35, whereby various data including the number of sample, the real exposure period, and the identification of the film used is printed out.

Various information described above is supplied through the input terminals 30A–30H and 31A–31G and through the decoder/latches 30, 31 to the CPU 27, which in turn controls the various portions of the photographing apparatus based upon such information.

In operation, when the initial command information ST is supplied to the CPU 27 through the input terminal 31A, the CPU 27 activates the shutter driver 10 to open the shutter 2, thus initiating a photographing operation. The photoelectric transducer element 11 of the photoelectric conversion circuit 4 determines light from an object being photographed, with its photocurrent supplied to the integrating circuit 12. The integrating circuit 12 integrates the photocurrent by a selected combination of the main capacitor 16 and additional capacitors 14A–14C. The integrated voltage is fed to the voltage comparator 21, which compares it against the reference voltage supplied from the reference voltage generator 23. If the integrated voltage exceeds the reference voltage as a result of such comparison, the operational amplifier 22 changes its output signal, which is supplied to the CPU 27. The change in the output signal allows the CPU 27 to recognize the exposure period.

The photographing apparatus of the invention sequentially calculates and displays an expected exposure period and the remainder of the exposure period during the course of the exposure lasting for an increased length of time because of a low level of illumination which gives rise to the failure of the reciprocity law. The calculation of the expected exposure period and the remainder of the exposure period will now be described.

To calculate the expected exposure period and the remainder of the exposure period in the course of an exposure, it is necessary to enable such calculation to be completed within a reduced length of time by sequentially changing the connection of the additional integrating capacitors 14A–14C in the integrating circuit 12 and also changing the reference voltage supplied from the reference voltage generator 23 in accordance with the connection of these integrating capacitors in the circuit of FIG. 3, by taking into consideration the film speed, the illuminance and other factors. It will be appreciated that the derivation of the exposure period within a reduced length of time is achieved by reducing the effective capacitance formed by the integrating capacitors 14A–14C, 16 of the integrating circuit 12 to determine the time when the integrated voltage reaches the reference voltage. In the previous description of the principle of the invention made in connection with FIGS. 1 and 2, it has been described that the exposure period T is related to the illuminance L by the equation (2). However, in practice, it is necessary to determine the exposure period in consideration of the response of the film used. By representing the film speed in ASA designation by $ASA_0$, the compensation factor for the film size by $S_0$ and the sample density distribution correction factor by $SC_O$, the equation (2) can be rewritten as follows:

$$T = \frac{K}{L} \times \frac{S_O}{ASA_O \times SC_O} \qquad (13)$$

Assume now that the exposure period T represents an exposure period $T_e$ in the linear region. One or more integrating capacitors are connected in the integrating circuit 12 to provide a capacitance C, and it is assumed that the photoelectric transducer element 4 produces a current $I = kL$ (where k is a constant) which is proportional to the illuminance L impinging upon the transducer element 11. When the current I is supplied to the integrating circuit 12, it produces an output voltage V which is indicated as follows:

$$V = \frac{I}{C} t \tag{14}$$

Figure 5:
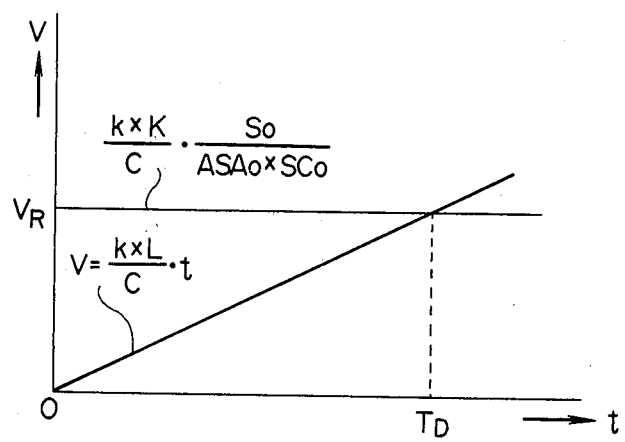
FIG. 5 graphically shows an output voltage of the integrating circuit shown in FIG. 3 as a function of time.

This relationship is graphically illustrated in FIG. 5, and it will be noted that the output voltage V from the integrating circuit 12 increases linearly with time t. A time $T_D$ required for the output voltage to reach a reference voltage $V_R$ represents a proper exposure period. It will be seen that the capacitance C of the integrating circuit and the reference voltage $V_R$ may be selected so that from the equations (13) and (14), the following equality applies:

$$T_D = \frac{K}{L} \times \frac{S_O}{ASA_O \times SC_O} \tag{15}$$

$$= \frac{kK}{I} \times \frac{S_O}{ASA_O \times SC_O}$$

$$= \frac{CV_R}{I}$$

In other words, the above equation may be modified as follows:

$$CV_R = k \times K \times \frac{S_O}{ASA_O \times SC_O} \tag{16}$$

It will be seen from the equation (15) that the time required for the output voltage from the integrating circuit 12 to reach the reference voltage $V_R$ will be shorter with a smaller value of the capacitance C. Hence, for an increased length of the exposure period, a reduced capacitance of the integrating capacitor may be chosen, thus determining a range of time which can be determined. The selected capacitance and the time determined are used to derive an expected exposure period.

A procedure to calculate an expected exposure period by a sequential selection of the capacitance of the integrating capacitors will now be described. As mentioned previously, the integrating capacitors are selected by selectively connecting the switches 15A–15C in accordance with a control signal supplied from the CPU 27. The capacitance is changed from a larger to a smaller value in a sequential manner. It is to be understood that the capacitance of the capacitors is grouped so as to correspond to different ranges of film speeds.

Figure 6:
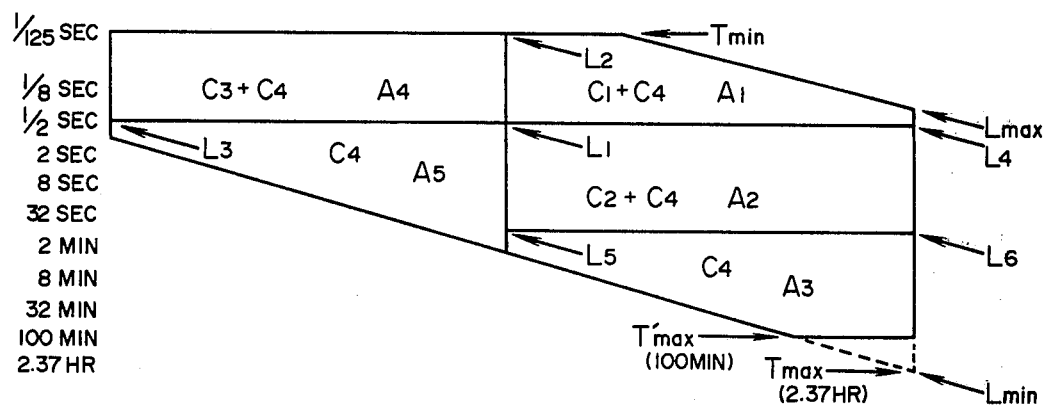
FIG. 6 is a diagram illustrating the relationship among the film speed, the exposure period, the illuminance and the capacitance of the integrating capacitor.

FIG. 6 diagrammatically illustrates the relationship among the film speed, the capacitance of integrating capacitor or capacitors, the exposure period and the illuminance. In this diagram, the film speed is indicated in terms of ASA values as well as modified film speed designation which is obtained by correcting the ASA value with the sample density distribution correction factor SC and the film size compensation factor S, which range from 1.5 to 25,600 (hereafter, this designation is referred as ASA film speed). The ordinate represents the exposure period from 1/125 second to 2.37 hours on the left-hand side, and the illuminance L is indicated by lines extending obliquely upward from right to left. It is to be understood that each line indicates a constant value of the illuminance L. A line indicating the maximum illuminance $L_{max}$ is located topmost while a line indicative of the minimum illuminance $L_{min}$ is located bottommost. The diagram is divided into a plurality of regions $A_1$–$A_5$ which can be determined by each selected combination of the integrating capacitors 14A–14C, 16 in the integrating circuit 12 in FIG. 3. The region $A_1$ corresponds to a range of ASA film speed from 1.5 to 200, a range of the illuminance from $L_{max}$ to $L_1$ and an exposure period from 1/125 second to ½ second. The region $A_2$ corresponds to an ASA film speed from 1.5 to 200, an illuminance from $L_4$ to $L_5$, and an exposure period from ½ second to 1 minute. The region $A_3$ corresponds to an ASA film speed from 1.5 to 200, an illuminance from $L_6$ to $L_{min}$, and an exposure period from one to one hundred minutes. The region $A_4$ corresponds to an ASA film speed from 200 to 25,600, an illuminance from $L_2$ to $L_3$, and an exposure period from 1/125 second to ½ second. Finally, the region $A_5$ corresponds to an ASA film speed from 200 to 25,600, an illuminance from $L_1$ to $L_{min}$, and an exposure period from ½ second to 2 minutes.

A particular combination of integrating capacitors 14A–14C and 16 which is used in a particular region is also indicated in this diagram. Specifically, representing the capacitance of the capacitors 14A to 14C and 16 by $C_1$, $C_2$, $C_3$ and $C_4$, respectively, the CPU 27 controls the combination of integrating capacitors in the integrating circuit 12 as shown in FIG. 6. Specifically, a combination of $C_1+C_4$ is used for the region $A_1$, a combination of $C_2+C_4$ for the region $A_2$, $C_4$ alone for the region $A_3$, a combination of $C_3+C_4$ for the region $A_4$, and $C_4$ alone for the region $A_5$. In an example, $C_1+C_4=0.18$ μF, $C_2+C_4=7200$ pF, $C_3+C_4=1500$ pF, and $C_4=60$ pF. Then the following ratios are obtained:

$$C_1+C_4 : C_2+C_4 : C_4 = 1 : 1/25 : 1/3000 \tag{17}$$

$$C_3+C_4 : C_4 = 1 : 1/25 \tag{18}$$

As will be apparent from FIG. 6, for the ASA film speed from 1.5 to 200, the CPU controls the connection of integrating capacitors in the integrating circuit 12 in a sequential manner of $C_1+C_4$ to $C_2+C_4$ to $C_4$ to determine an expected exposure period. For the ASA film speed from 200 to 25,600, the capacitance is changed in the sequence of $C_3+C_4$ to $C_4$ to determine an expected exposure period. It will be appreciated that such change of the capacitance of the integrating capacitors is achieved by selectively operating the switches 15A to 15C under the control of the CPU 27. Assuming that the ASA film speed information from 1.5 to 200 is supplied through the input terminal 30A, the CPU 27 initially closes the switch 15A through the decoder/latch 28 and the switch driver 20A, connecting the integrating capacitor 14A across the input and the output of the operational amplifier 13 to provide a composite capacitance of $C_1+C_4$ which corresponds to the region $A_1$. When an integrated voltage with this capacitance cannot reach the reference voltage within 0.5 second, the CPU 27 detects this fact, and then operates to close the switch 18 through the decoder/latch 28 and the switch drive circuit 19, thus discharging the integrating capacitors 14A and 16 through the switch 18 and the resistor 17.

Subsequently, it opens the switch 15A, and closes the switch 15B instead to provide a composite capacitance of $C_2+C_4$, formed by the integrating capacitors 14B and 16, which corresponds to the region $A_2$, reinitiating an integrating operation. As the region is changed from $A_1$ to $A_2$, the capacitance changes from $C_1+C_4$ to $C_2+C_4$. Considering the ratio of capacitances, it is seen that the capacitance of $C_2+C_4$ is lower than that of $C_1+C_4$ by a factor of 25, as indicated in the equation (17). Consequently, when the reduced capacitance is used in an integrating operation, the integrated voltage increases as rapidly as 25 times the previous rate, reaching the reference voltage level at an earlier time. Hence, an exposure period thus determined may be multiplied by 25 to provide an actual, expected exposure period. If the integrated voltage does not reach the reference voltage level within 2.4 seconds in the operating region $A_2$, or when it does not reach the reference voltage after one minute which is 25 times 2.4 seconds to represent an actual exposure period, the operating region is further changed for photometry from $A_2$ to $A_3$ in the manner mentioned above, thus further reducing the capacitance by a factor of 3000, as indicated in the equation (17). For the ASA film speed from 200 to 25,600, the same procedure is employed.

Considering the establishment of the reference voltage, the reference voltage is established so that an integrated voltage reaches the reference voltage in 0.5 seconds for the ASA value of 200 and the illumination of $L_1$ in the operating regions $A_1$ to $A_3$. With this reference voltage, the exposure period will be 1/125 second for the illuminance of $L_2$ and the ASA value of 200. In the equal to $25600 \times 2/50 \times 1/125 = 1.28 \times 10^{50}$, a very large figure. Theoretically, a ratio of the maximum exposure period and the minimum exposure period is $2.37 \times 60 \times 60/(1/125) \approx 10 \times 10^{15}$. However, for practical purposes, an exposure period in excess of two hours is insignificant, and hence the maximum exposure period $T'_{max}$ is chosen equal to 100 minutes. The exposure period $T_f$ which is used during a flash photography is equal to 100 microseconds as mentioned previously. Choosing this value as the minimum exposure period, $T'_{max}/T_f$ is equal to $8.5 \times 10^7$, again a very large figure. In this manner, the dynamic range of the illuminance which can be determined by photometry is greatly increased as is the exposure period.

The data illustrated in FIG. 6 is tabulated in the following table where the expected exposure period $T_e$, the photometric technique, the integrating interval $T_c$, and the equation used to calculate the expected exposure period $T_e$ are shown as a function of the value of the ASA film speed, the capacitance of the integrating circuit and the operating regions. In this table, a direct integration is indicated under the column of the photometry technique since it is useless to indicate an expected exposure period or the remainder of the exposure period when the exposure period is less than 0.5 seconds. In such an instance, no calculation is made, and instead the direct integration is employed. For an exposure period in excess of 0.5 seconds, an integrating interval is determined by utilizing an integrating capacitor or capacitors of a reduced capacitance, and an expected exposure period is calculated from the integrating interval using the equation indicated.

| $\left(\dfrac{ASA \times SC}{S}\right)$ | Capacitance of integrating capacitor | Operating region | Expected exposure period | Photometry technique | Integrating interval $T_c$ | Equation for calculation |
|---|---|---|---|---|---|---|
| 1.5 to 200 | $C_1 + C_4$ | $A_1$ | $T_e \leq \frac{1}{2}$ sec | Direct integration | $T_c = T_e \leq \frac{1}{2}$ sec | — |
|  | $C_2 + C_4$ | $A_2$ | $\frac{1}{2}$ sec $< T_e \leq 1$ min | Calculation | 20ms $< T_c \leq 2.4$ sec | $T_e = T_c \times 25$ |
|  | $C_4$ | $A_3$ | 1 min $< T_e \leq 100$ min | Calculation | 20ms $< T_c \leq 2$ sec | $T_e = T_c \times 3000$ |
| 200 to 25600 | $C_3 + C_4$ | $A_4$ | $T_e \leq \frac{1}{2}$ sec | Direct integration | $T_c = T_e \leq \frac{1}{2}$ sec | — |
|  | $C_4$ | $A_5$ | $\frac{1}{2}$ sec $< T_e \leq 2$ min | Calculation | 20ms $< T_c \leq 4.8$ sec | $T_e = T_c \times 25$ | operating regions $A_4$ and $A_5$, the reference voltage is established so that the integrated voltage reaches the reference level in 1/125 second for the illuminance $L_2$ and the ASA value of 200 and reaches the reference value in 0.5 seconds for the illuminance $L_3$ and the ASA value of 25600. However, in the operating regions $A_1$ and $A_4$, assuming that $C_1+C_4 \neq C_3+C_4$, the reference voltage is established so that the reference value $V_{RL}$ for an ASA value less than 200 (ASA$_L$) and the reference value $V_{RM}$ for an ASA value not less than 200 (ASA$_H$) satisfies the following equality:

$$\frac{V_{RL}}{V_{RM}} = \frac{(C_3 + C_4) \times ASA_H}{(C_1 + C_4) \times ASA_L} \qquad (19)$$

Figure 7:
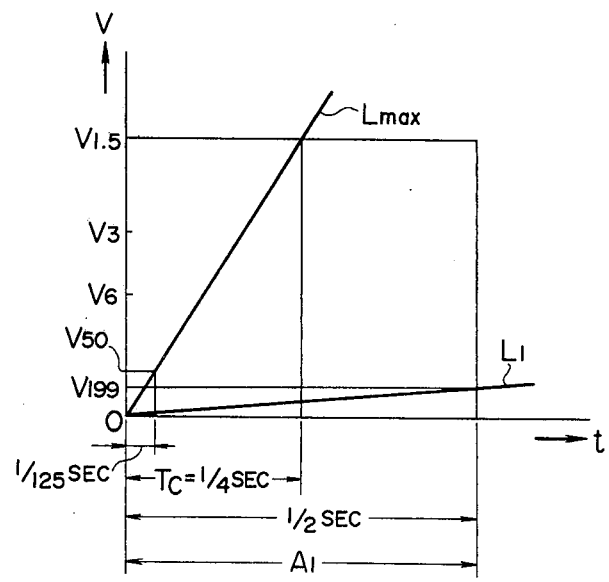
FIGS. 7 to 11 graphically illustrate the operation of the individual regions shown in FIG. 6.

Considering the dynamic range of the photometry, it is seen from FIG. 6 that the ratio of the maximum illuminance $L_{max}$ and the minimum illuminance $L_1$ which can be determined in the region $A_1$ is equal to $2.5 \times 10^2$ while the ratio of the maximum illuminance $L_2$ and the minimum illuminance $L_3$ which can be determined in the region $A_4$ is equal to $8 \times 10^3$. The ratio of the maximum illuminance $L_{max}$ and the minimum illuminance $L_{min}$ which can be determined in the entire region is The manner of deriving a required exposure period in the linear region will be more closely described below with reference to FIG. 6 and the table indicated above. FIG. 7 illustrates the operation in the region $A_1$, with an integrating voltage V shown on the ordinate and plotted against time t shown on the abscissa. Since the reference voltage is determined in proportion to S/(ASA+SC) as mentioned previously, the reference value will be reduced for an increased value of ASA. Reference values for ASA$\times$SC/S of 1.5, 3, 6 ... 199 will be indicated by $V_{1.5}$, $V_3$, $V_6$... $V_{199}$. For ASA$\times$SC/S of 1.5, the integrated voltage will reach the reference value $V_{1.5}$ in $\frac{1}{4}$ second for the maximum illuminance $L_{max}$. For the ASA$\times$SC/S value of 199, the integrated voltage will reach the reference value $V_{199}$ in 0.5 seconds for the illuminance $L_1$. For ASA$\times$SC/S of 50, the integrated voltage will reach the reference value $V_5$ in 1/125 second for the maximum illuminance $L_{max}$. When a picture is taken under a condition greater than ASA$\times$SC/S of 50 with the maximum illuminance, the integrated voltage will reach the reference value earlier than 1/125 second. In this instance, the shutter 2 may be operated at a corresponding time, but since it is a rare occurrence that the shutter be closed within a period less than 1/125 when taking a picture with the microscope, an alarm may be given to the user for the time interval less than 1/125 second. When such an alarm is given, the film may be replaced by one having lower film speed or the illumination level may be reduced. No direct photometry takes place in the region $A_1$ as indicated in FIG. 7, so that the exposure can be interrupted at the moment when the integrated voltage reaches the reference value. Accordingly, in this region, the remainder of the exposure period is not displayed.

Figure 8:
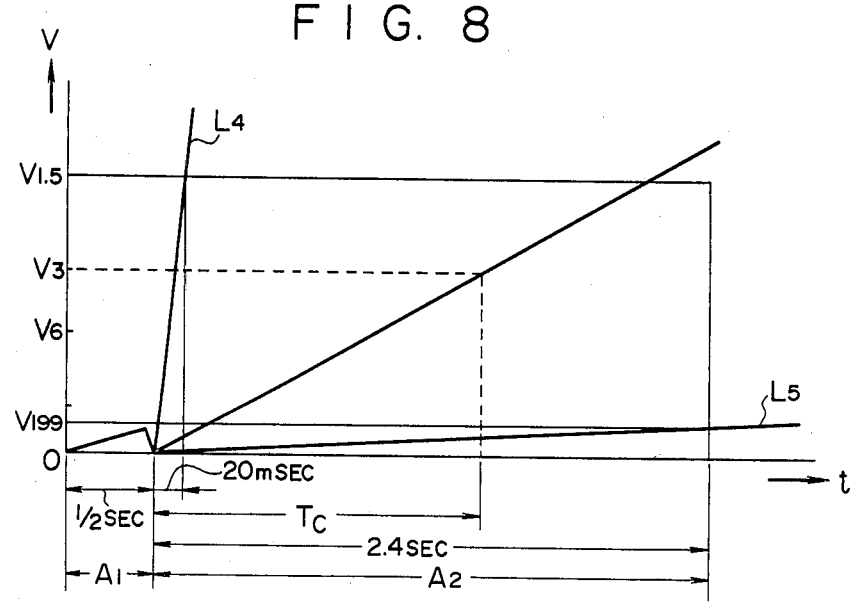

FIG. 8 illustrates the operation in the regions $A_1$ and $A_2$. If the integrated voltage does not reach the reference value in 0.5 second which is the photometric period for the region $A_1$, the CPU 27 feeds a signal to the switch drive circuit 19 through the decoder/latch 28 to close the switch 18, thus discharging the capacitors 14A and 16 in a reduced period of time. Subsequently, it causes the switches 15A and 18 to be opened and causes the switch 15B to be closed, thus connecting the capacitors 14B and 16 into circuit. A composite capacitance $C_2+C_4$ is thus obtained which has a magnitude equal to 1/25 times the composite capacitance $C_1+C_4$. Accordingly, the integrated voltage rises as rapidly as 25 times the previous rate. Assuming that $ASA \times SC/S$ is chosen equal to 3, it may be assumed that an integrating operation in the region $A_2$ permits the reference value $V_3$ to be reached after $T_c$ seconds. The expected exposure period $T_e$ is equal to $T_c \times 25$. It is unnecessary to consider circumstances that the reference value is reached within 20 milliseconds for the operating region $A_2$ shown in FIG. 8 because when $T_c$ is equal to 20 milliseconds, the expected exposure period $T_e$ is equal to $20 \times 10^{-3} \times 25 = 0.5$ second, indicating that a direct photometry takes place in the region $A_1$. When $ASA \times SC/S$ is chosen equal to 1.5, the reference value $V_{1.5}$ is reached in just 20 milliseconds for the illuminance of $L_4$, so that the maximum illuminance in the region $A_2$ is $L_4$. When $ASA \times SC/S$ is chosen equal to 199, the integrated voltage reaches the reference value in 2.4 seconds for the illuminance of $L_5$. The exposure period $T_e$ in this instance will be equal to $2.4 \times 25 = 60$ seconds or one minute. Accordingly, exposure period $T_e$ which can be determined in the region $A_2$ is, $\frac{1}{2}$ second $< T_e \leq$ one minute.

Figure 9:
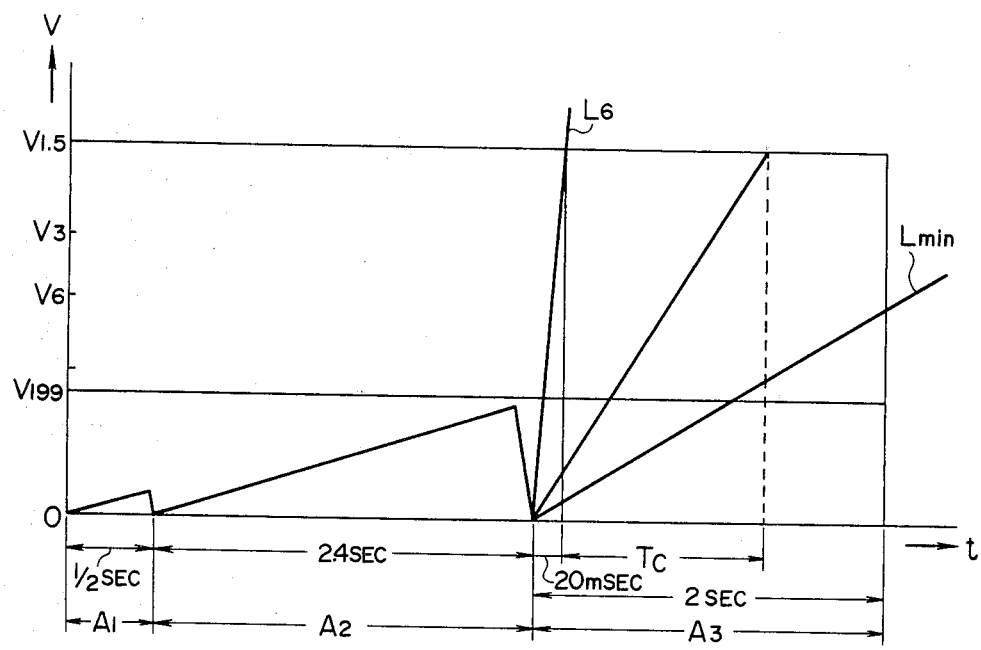

FIG. 9 illustrates the operation in the regions $A_1$, $A_2$ and $A_3$. As will be apparent from FIG. 8, with an illuminance lower than $L_5$, the integrated voltage cannot reach the reference value $V_{199}$ in 2.4 seconds from the initiation of integrating operation if the picture is taken with $ASA \times SC/S = 199$. In such instance, the switch 18 is closed again to discharge capacitors 14B and 16 rapidly, and thereafter the switches 15B and 18 are opened, allowing the capacitor 16 alone to be connected in circuit. The resulting capacitance $C_4$ is less than that of $C_1 + C_4$ by a factor of 3000. If the reference value is reached within 20 milliseconds from the initiation of the integrating operation, the photometry can be completed in the region $A_2$. Accordingly, the photometry between the maximum illuminance of $L_6$ and the minimum illuminance $L_{min}$ may be performed in the region $A_3$. Since the longest practical exposure period is chosen equal to 100 minutes = 6000 seconds, the maximum integrating interval $T_c$ in the region $A_3$ is equal to 2 seconds. The reference value may not be reached within the maximum integrating interval associated with the region $A_3$ depending on the ASA film speed and the illuminance involved, but in such instance an alarm may be given to the user to indicate the insufficient value.

Figure 10:
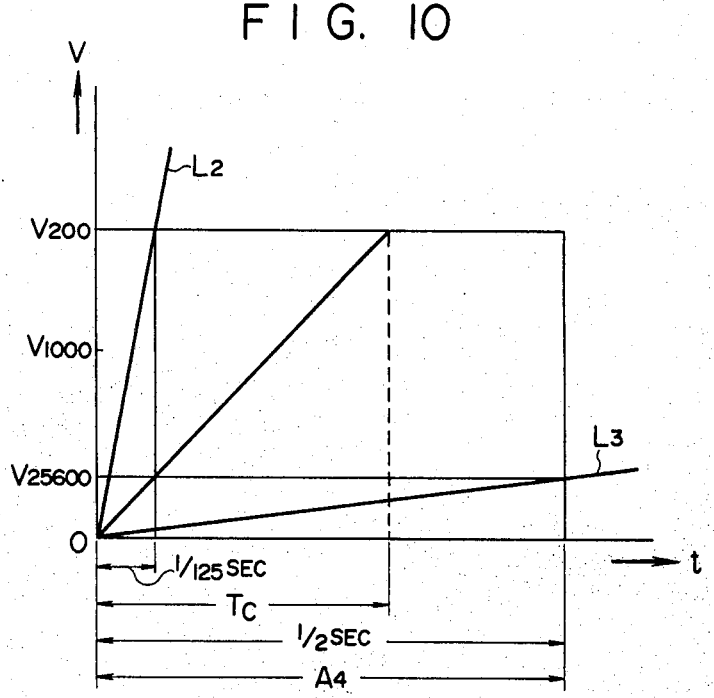

FIG. 10 illustrates the photometric operation in the region $A_4$, which is selected for the first time when taking a picture with $ASA \times SC/S$ which is not less than 200. When a value of $ASA \times SC/S$ is chosen which is not less than 200, the switch 15C is closed, thus connecting the capacitors 14C and 16 into circuit. The composite capacitance is equal to $C_3 + C_4$. In the region $A_4$, the direct photometry is performed. However, the maximum integrating interval is 0.5 seconds as in the region $A_1$. In the operating region $A_4$, with $ASA \times SC/S = 200$, the reference value $V_{200}$ will be reached in 1/125 second for the illuminance of $L_2$. With $ASA \times SC/S = 25600$, the reference value $V_{25600}$ will be reached in 0.5 second for the illuminance of $L_3$.

Figure 11:
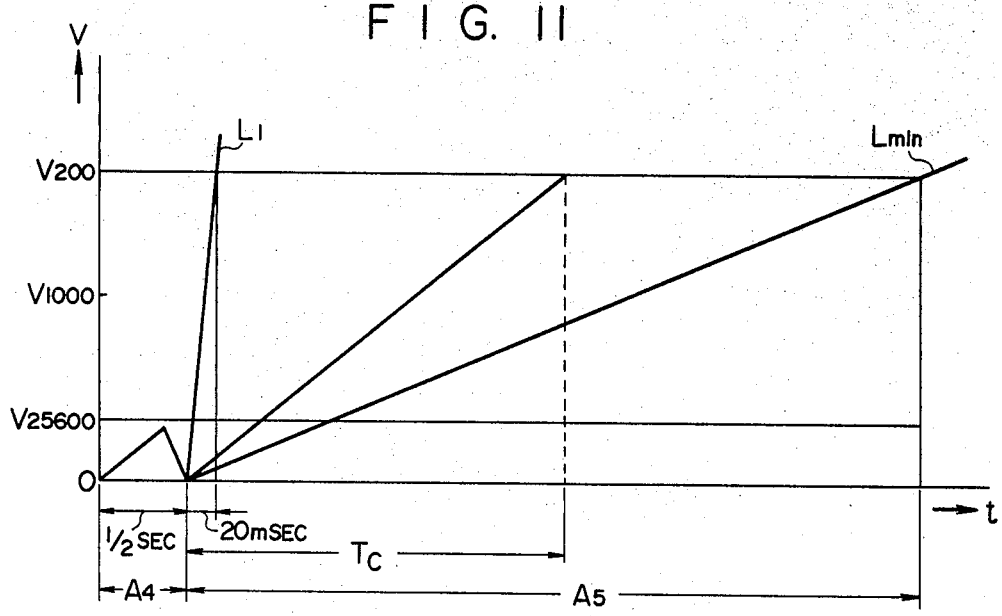

FIG. 11 illustrates the integrating operation in the region $A_5$. When the reference value is not reached in 0.5 seconds as a result of the photometry in the region $A_4$, the switch 18 is closed to discharge the capacitors 14C and 16, and then the switches 15C and 18 are opened to permit an integrating operation by means of the capacitor 16 alone in the region $A_5$. As mentioned previously, the capacitance $C_4$ of the capacitor 16 is less than the composite capacitance $C_3 + C_4$ by a factor of 25. Since the maximum exposure period is chosen to be equal to two minutes or 120 seconds for $ASA \times SC/S$ equal to or greater than 200, the maximum integrating interval $T_c$ in the region $A_5$ is 4.8 seconds. Specifically, with $ASA \times SC/S$ which is equal to 200, the reference value will be reached by integrating over 4.8 seconds for the illuminance of $L_{min}$. If the reference value is reached within 20 milliseconds, the photometry is possible in the region $A_4$, and hence the limiting value is the illuminance of $L_1$ for $ASA \times SC/S$ which is equal to 200. In the region $A_5$, the expected exposure period $T_e$ is equal to 25 times the integrating interval $T_c$.

As discussed, in accordance with the invention, the calculation control circuit 26 may be utilized to derive the expected exposure period $T_e$ by automatically switching integrating capacitors in and out of the circuit depending on the ASA speed, film characteristics such as SC or S and the illuminance which are supplied to the apparatus before a photographing operation takes place. In the present embodiment, if the integrated voltage reaches the reference value in the region $A_2$, for example, the switch 18 may be immediately closed to discharge the capacitors 14B and 16, and then the switch 18 may be opened to reinitiate the integrating operation. This may be repeated for the interval of the exposure.

As mentioned previously, in accordance with the invention, an equivalent exposure period $T_E$ is subtracted from an expected exposure period $T_e$, which is sequentially calculated, to derive the remainder of the exposure period $T_R$ for display. The remainder of the exposure $T_R$ is derived by substituting the exposure period $T_e(t_m)$ in the linear region for $T'_e$ in the equation (7). However, when the described integrating circuit 12 and the comparator 21 are used, the second right-hand term of the equation (7) cannot be directly obtained. However, since $K = L(t_i) \cdot T(t_i) = L(t_m) \cdot T(t_m)$, the equation (7) can be rewritten as follows:

$$T_R(t_m) = T_e(t_m) - \sum_{i=1}^{m} \frac{T_e(t_m)}{T_e(t_i)} \times \Delta t_i \qquad (20)$$

In this equation, $T_e(t_m)$ represents an expected exposure period at time $t_m$, $T_e(t_i)$ represents an expected exposure period which is derived at time $t_1, t_2 \ldots$, and $\Delta t_i$ represent intervals $t_2-t_1, t_3-t_2 \ldots$. Hence, the remainder of the exposure period $T_e(t_m)$ at time $t_m$ can be calculated.

The present embodiment also effects a correction in the exposure period in the linear region for the failure of the reciprocity law, which can be practiced only for an increased length of an exposure period. Thus, no correction for the failure of the reciprocity law is made in regions $A_1$ and $A_4$. The direct photometry is effected in these regions intrinsically, and hence any correction for the failure cannot be made. Accordingly, the correction is performed in the regions $A_2$, $A_3$ and $A_5$. In these regions, the remainder of the exposure period $T_R(t_m)$ as represented by the equation (20) can be calculated to effect the correction, and a corrected, expected exposure period $T'_e(t_m)$ can be expressed as given in the equation (4), $$T'_e = \alpha T_e(t_m)^\beta$$

Hence, as a result of the correction, the remainder of the exposure period $T'_R(t_m)$ can be expressed as follows:

$$T'_R(t_m) = T'_e(t_m) - \sum_{i=1}^{m} \frac{T'_e(t_m)}{T'_e(t_i)} \times \Delta t_i \quad (21)$$

This is substantially the same as the equation (7) given above.

The above has described the manner in which a picture can be taken of the object 1 in a proper exposure period in which the failure of the reciprocity law is corrected for, and the remainder of the exposure period can be sequentially indicated by the display 8 in the course of taking a picture of the object 1 being photographed in accordance with the invention. The display may be updated after each photometry, or the remainder can be progressively decreased in response to a signal from a timer as the sequential calculation is made. In this instance, it is possible that a display may indicate an increased length for the remainder. After the photographing operation, the actual exposure period can be displayed. This can be performed by applying the actual exposure period read command to the input terminal 31E of the decoder/latch 31. While in the described arrangement, one of the integrating capacitors is normally connected in circuit, it will be understood that all of the capacitors may be switched in and out. Alternatively, a plurality of capacitors may be selectively connected into series or parallel relationship to change the time constant of the integrating operation.

What is claimed is:

1. A photographing apparatus comprising a photoelectric conversion circuit including a photoelectric transducer element which continuously determines the brightness of an object being photographed for producing an output signal which corresponds to the brightness of the object, means for presetting correction factors to correct for the failure of the film reciprocity law and which depend on the film being used, means for sequentially calculating an expected exposure period on the basis of the correction factors and said output signal from the photoelectric conversion circuit, the calculating means calculating the expected exposure period during an exposure period which has been corrected for the failure of the film reciprocity law, means for determining an equivalent exposure period from the initiation of the exposure until the instant when the expected exposure period has been determined and which has been corrected for the failure of the film reciprocity law, means for sequentially deriving the remainder of the exposure period by subtracting said equivalent exposure period from the value of said expected exposure period calculated by the calculating means, and a shutter drive circuit for opening a shutter at the initiation of the exposure period and for closing the shutter at the time when the corrected remainder of the exposure period is substantially zero.

2. A photographing apparatus according to claim 1 in which the combination of the means for sequentially calculating the expected exposure period, the means for determining the equivalent exposure period, and the means for sequentially deriving the remainder of the exposure period comprises an integrating circuit including a plurality of integrating capacitors which can be selectively switched in and out of circuit for integrating said output signal from the photoelectric conversion circuit, means for producing a reference voltage against which an output signal from the integrating circuit is compared, a comparator for comparing the output signal from the integrating circuit against the reference voltage from said producing means to produce an output signal, and a central processing unit for monitoring said output signal from the comparator for controlling a selective connection of the integrating capacitors in the integrating circuit and for selectively controlling the value of the reference voltage in association with the selective connection of the integrating capacitors, the central processing unit selectively changing the connection of the integrating capacitors in the integrating circuit in association with the value of the reference voltage when an increased exposure period is involved, thereby controlling the integrating interval of the integrating circuit in order to calculate an exposure period.

3. A photographing apparatus according to claim 2 in which the integrating circuit comprises an operational amplifier, a fixed integrating capacitor connected across an input and the output of the operational amplifier, a plurality of series circuits each including an integrating capacitor and a switch and connected across the input and the output, and another series circuit including a resistor and a switch connected across the input and the output.

4. A photographing apparatus according to claim 3, further including a decoder/latch for storing and decoding a control signal delivered from the central processing unit which is used to control the switches, and a switch drive circuit responsive to an output signal from the decoder/latch to control the opening and closing of the switches.

5. A photographing apparatus according to claim 2 in which the comparator comprises an operational amplifier.

6. A photographing apparatus according to claim 2 in which said means for producing the reference voltage comprises a digital-analog converter for receiving digital information delivered from the central processing unit which indicates the value of a reference voltage and converts it into a corresponding analog reference voltage, and a plurality of switches for feeding the output reference voltage from the converter to the comparator, said switches being adapted to be selectively closed or opened in association with the selective connection of the integrating capacitors.

7. A photographing apparatus according to claim 1 or 2 in which said means for presetting correction factors comprises a first decoder/latch for receiving input information concerning the characteristics of the film being used such as film speed, and correction factors to correct for the failure of the film reciprocity law, and for supplying it to the calculating means in the form of the central processing unit, and a second decoder/latch for receiving input information concerning other photographing information and supplying it to the central processing unit.

8. A photographing apparatus comprising a photoelectric conversion circuit for effecting photometry of light from an object being photographed:
an integrating circuit including a plurality of integrating capacitors which can be selectively switched in and out of the circuit for integrating an output signal from the photoelectric conversion circuit;
a circuit for producing a reference voltage against which an output signal from the integrating circuit is compared;
a comparator for comparing said output signal from the integrating circuit against the reference voltage;
a central processing unit for monitoring an output signal from the comparator to calculate and control an exposure period; and
input means for supplying input information to the central processing unit, the input information including information concerning the film being used such as a film speed or correction factors to correct for the failure of the film reciprocity law and other photographing conditions;
said central processing unit receiving input information relating to film characteristics and photographing conditions which is supplied through the input means to control a selective connection of the integrating capacitors in the integrating circuit and to control selectively the value of the reference voltage on the basis of such input information, the central processing unit further changing the connection of the integrating capacitors in response to an increased exposure period to achieve a suitable capacitance which determines the integrating interval of the integrating circuit to allow the exposure period to be determined, thus calculating an expected exposure period, an equivalent exposure period, and the remainder of the exposure period in which the failure of the film reciprocity law is corrected for based on the input information supplied through the input means and inclusive of the correction factors.

9. A photographing apparatus, comprising:
means for determining the brightness of an object being photographed and for producing an output signal which corresponds to the brightness of said object;
means for presetting correction factors into said apparatus dependent on the film being used;
means for sequentially calculating a corrected, expected exposure period, a corrected equivalent exposure period, and a corrected remainder of the exposure period during an exposure period in response to said output signal and said correction factors;
an integrating circuit controlled by said calculating means and including a plurality of integrating capacitors which are selectively switched in and out of said integrating circuit for changing the integrating rate of said integrating circuit during the exposure period; and
a shutter drive circuit for opening a shutter at the initiation of the exposure period and for closing said shutter at the end of said corrected, expected exposure period in response to said calculating means.

10. A photographing apparatus according to claim 9 further including means for changing the connection of said integrating capacitors in said integrating circuit in order to change the time interval for calculating the corrected expected exposure period.

11. A photographing apparatus, comprising:
first means for generating a signal during an exposure period which is a function of the light received by said first means from an object being photographed, responsive to a shutter opening;
second means for providing a reference voltage;
integrating means for integrating said signal;
comparator means for comparing said integrated signal against said reference voltage to generate an output signal;
exposure period determining means responsive to said output signal and selected data representing the characteristics of the film being used for changing the rate of integration of said signal during said exposure period for determining an output representing a corrected, expected exposure period; and
a shutter drive circuit for closing the shutter to provide a proper exposure at the end of said exposure period.

12. A photographing apparatus including a shutter, comprising:
means for presetting correction factors to correct for the failure of the film reciprocity law and which depend on the film being used;
first means for generating a signal which is a function of light received by said first means from the object being photographed, responsive to a shutter opening;
second means for providing a reference voltage;
integrating means for integrating said signal;
comparator means for comparing said integrated signal against said reference voltage to generate an output signal;
means responsive to said output signal and said correction factors for sequentially calculating a corrected, expected exposure period, a corrected equivalent exposure period and a corrected remainder of said exposure period during an exposure;
said integrating means being responsive to said calculating means for integrating said signal from said first means and for changing the integrating rate during said exposure period to reach said reference voltage before the time said shutter should be closed; and
a shutter drive circuit for closing the shutter to provide a proper exposure at the end of said corrected, expected exposure period.

13. A photographing apparatus including a shutter, comprising:
means for presetting correction factors to correct for the failure of the film reciprocity law and which depend on the film used;
first means for generating a signal which is a function of light received by said first means from an object being photographed, responsive to a shutter opening;
second means for providing a reference voltage;
integrating means for integrating said signal;
comparator means for comparing said integrated signal against said reference voltage to generate an output signal;
means responsive to said output signal and said correction factors for sequentially calculating a corrected, expected exposure period, a corrected equivalent exposure period and a corrected remainder of said exposure period during an exposure period; and
a shutter drive circuit for closing the shutter to provide a proper exposure at the end of said corrected, expected exposure period.

* * * * *

UNITED STATES PATENT AND TRADEMARK OFFICE
CERTIFICATE OF CORRECTION

PATENT NO. : 4,359,273

DATED : November 16, 1982

INVENTOR(S) : Aihara, et al.

It is certified that error appears in the above—identified patent and that said Letters Patent is hereby corrected as shown below:

Column 1, line 45, Equation (1), insert --'-- after first "T".

Column 3, line 21, change "circuit6" to --circuit 6--.

Column 4, line 25, change "$T_o$" to --$t_o$--.

Column 5, line 20, Equation (5), insert --'-- after "T".

Column 5, lines 27-31, Equation (6), insert --'-- after each "T" (four occurrences).

Column 12:

Line 52, beginning with the word "to" up to line 56, ending with the word "from" should be changed from italics print to regular print.

UNITED STATES PATENT AND TRADEMARK OFFICE
CERTIFICATE OF CORRECTION

PATENT NO. : 4,359,273

DATED : November 16, 1982

INVENTOR(S) : Aihara, et al.

It is certified that error appears in the above—identified patent and that said Letters Patent is hereby corrected as shown below:

Column 17:

Line 20, insert --'-- after "T" (first occurrence);

Line 25, Equation (21), insert --'-- after each "T" (four occurrences).

Signed and Sealed this

Fifth Day of July 1983

[SEAL]

Attest:

GERALD J. MOSSINGHOFF

Attesting Officer     Commissioner of Patents and Trademarks